United States Patent [19]
Dam et al.

[11] Patent Number: 5,541,375
[45] Date of Patent: Jul. 30, 1996

[54] SWITCH FOR COMPUTER PEN

[75] Inventors: Robert Dam, Buffalo Grove; Joseph J. Gierut, Rockford, both of Ill.; Richard D. McAffrey, Glendale, Ariz.

[73] Assignee: Illinois Tool Works Inc., Glenview, Ill.

[21] Appl. No.: 335,073

[22] Filed: Nov. 7, 1994

Related U.S. Application Data

[63] Continuation-in-part of Ser. No. 210,935, Mar. 21, 1994.

[51] Int. Cl.$^6$ ............................. H01H 35/00; G06F 3/00; G06K 11/18
[52] U.S. Cl. ................. 200/52 R; 178/18; 200/61.42
[58] Field of Search .................... 200/52 R, 61.41, 200/61.42, 61.76–61.83, 276, 276.1, 292; 341/5; 345/179; 178/18, 19

[56] References Cited

U.S. PATENT DOCUMENTS

| | | | |
|---|---|---|---|
| 2,334,271 | 11/1943 | Malm et al. | 200/61.42 |
| 3,934,101 | 1/1976 | Jones | 200/61.54 |
| 4,268,730 | 5/1981 | Higgins et al. | 200/52 R |
| 4,491,688 | 1/1985 | Schaub et al. | 178/18 |
| 4,564,730 | 1/1986 | Tomizu et al. | 200/61.76 X |
| 4,681,994 | 7/1987 | Nagata et al. | 200/61.76 X |
| 4,695,680 | 9/1987 | Kable | 178/19 |
| 4,795,863 | 1/1989 | Tomizu et al. | 200/61.76 X |
| 5,410,334 | 4/1995 | Comerford | 345/179 |

*Primary Examiner*—J. R. Scott
*Attorney, Agent, or Firm*—Davis Chin; Donald J. Breh; Thomas W. Buckman

[57] ABSTRACT

A switch structure is provided for use in computer pen-based applications which can be easily adapted to perform either as a "writing" pen, an "artist" pen, or a "CAD" pen. The switch structure includes a top compression spring, an actuator, a bottom compression spring, a pair of PCB-connectible terminal pins, a printed circuit board having a pair of fixed spaced-apart electrodes and a cover plate which are especially arranged within a housing. The pair of terminal pins are in engagement with a respective one of the pair of electrodes. In one preferred embodiment, one end of the bottom compression spring contactly engages the pair of terminal pins to produce an electrical connection between the pair of electrodes when the actuator is in its fully extended position. The components of the switch structure can be easily modified so as to be utilized in each of the three common pen applications, thereby reducing cost in manufacturing and assembly. The uniquely-designed PCB-connectible terminal pins are adapted for electrical connections with a pair of electrodes formed on the printed circuit board, thereby eliminating the necessity for soldering hard-wire connections.

18 Claims, 8 Drawing Sheets

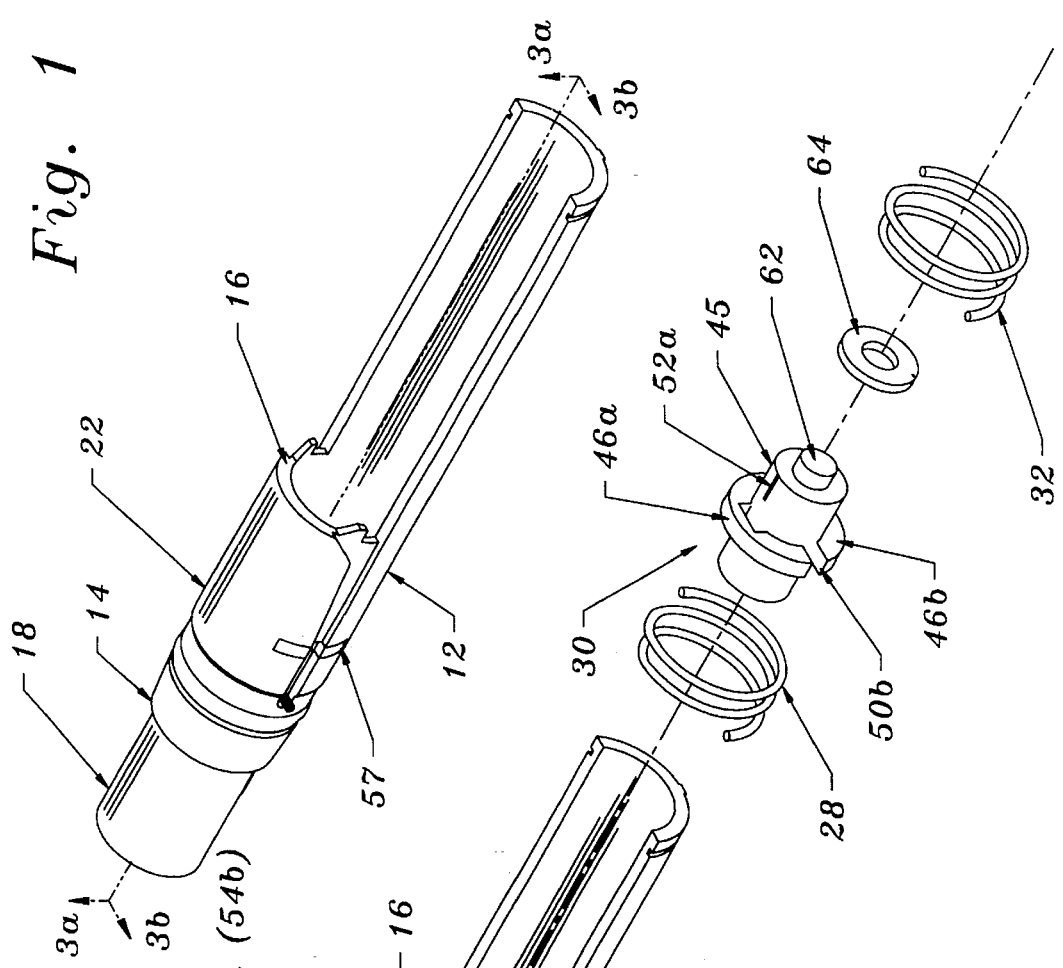

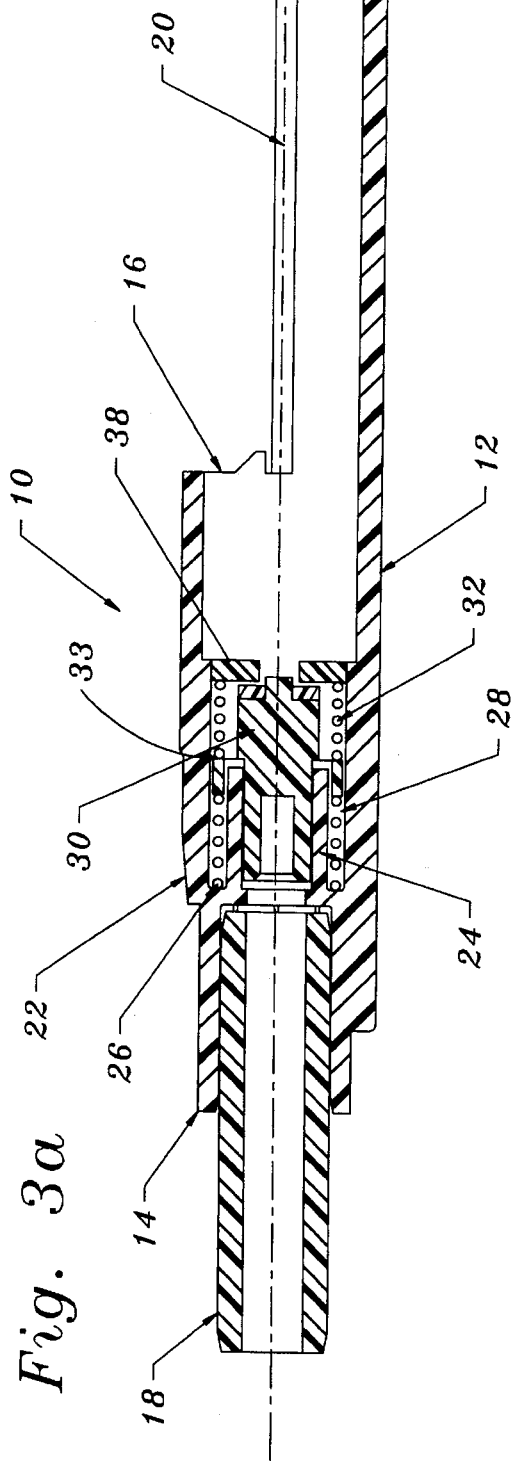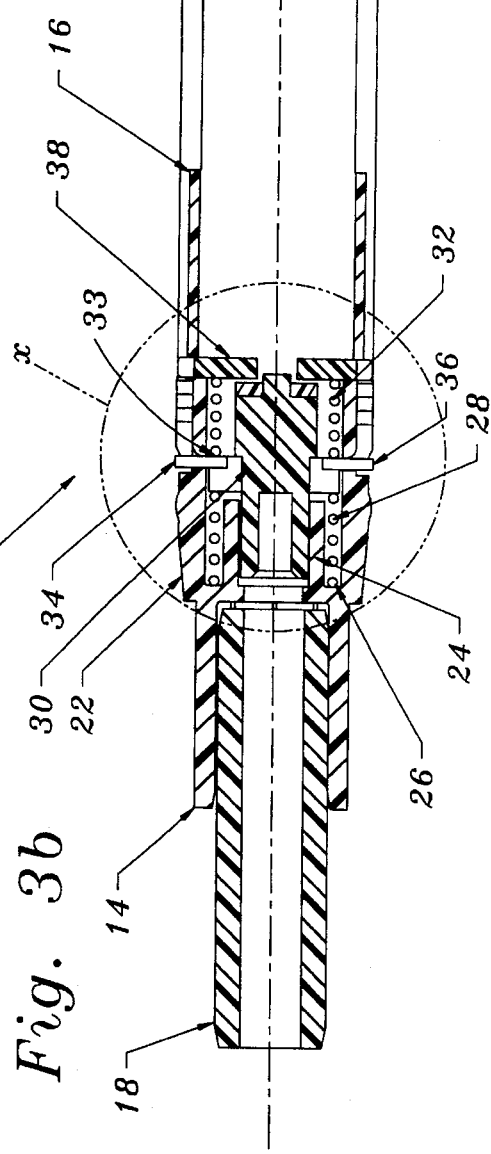

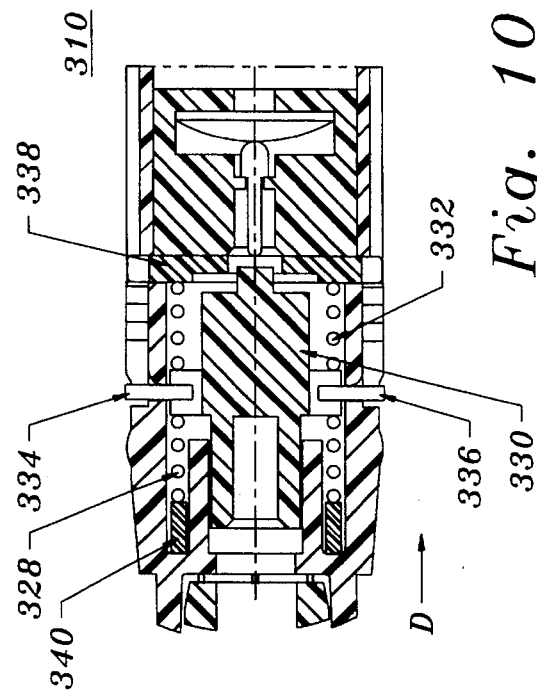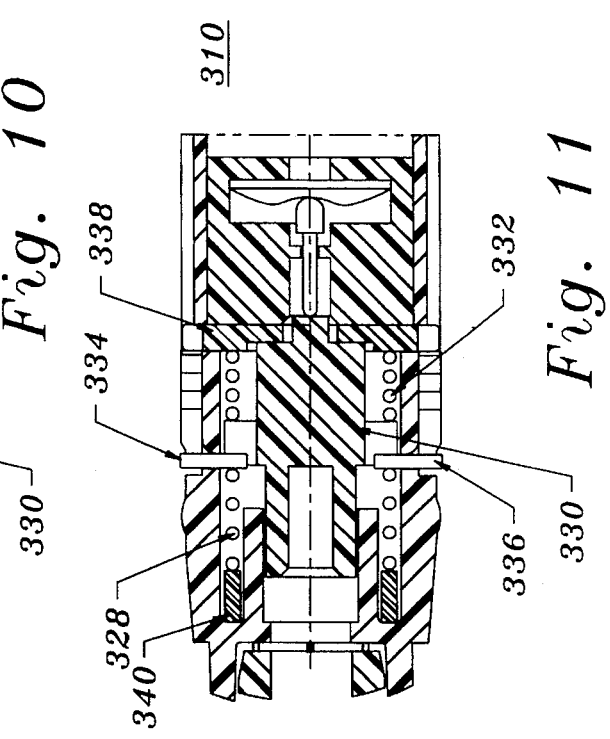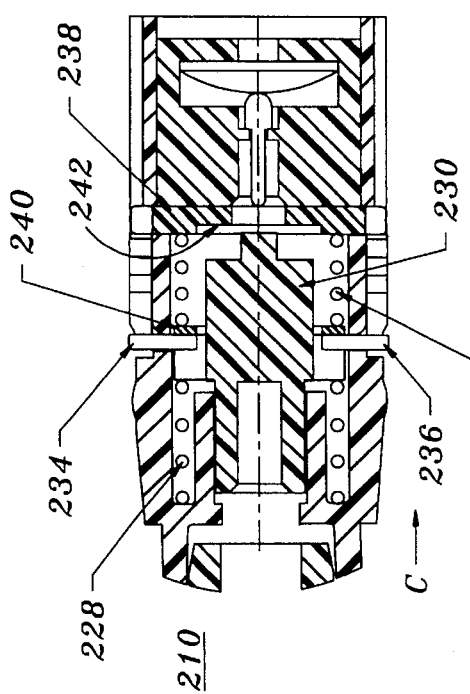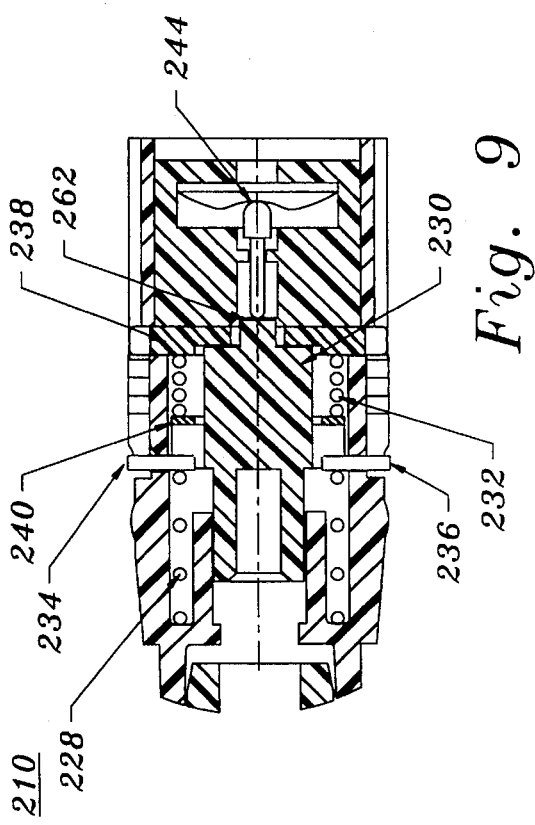

Fig. 12
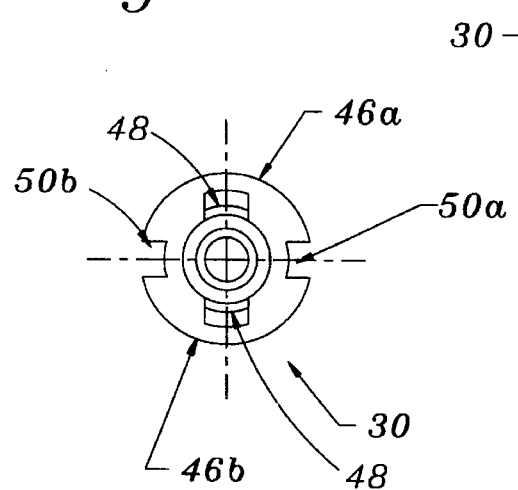
Fig. 13
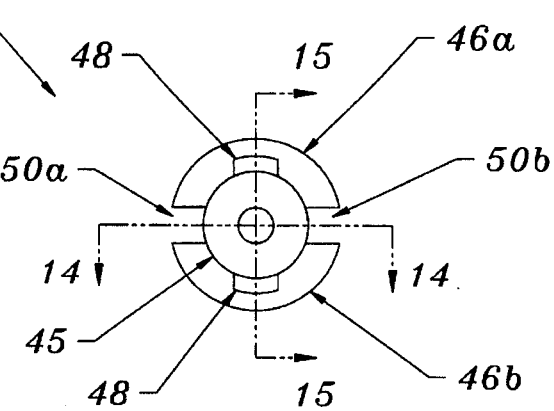
Fig. 15
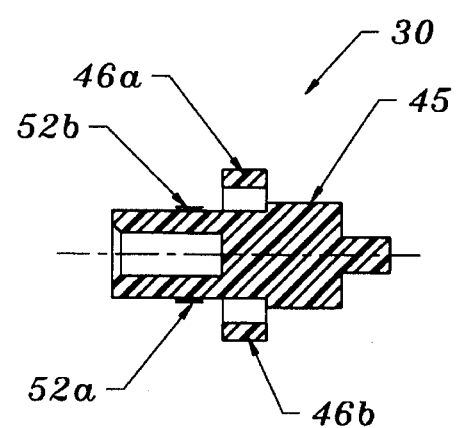
Fig. 14
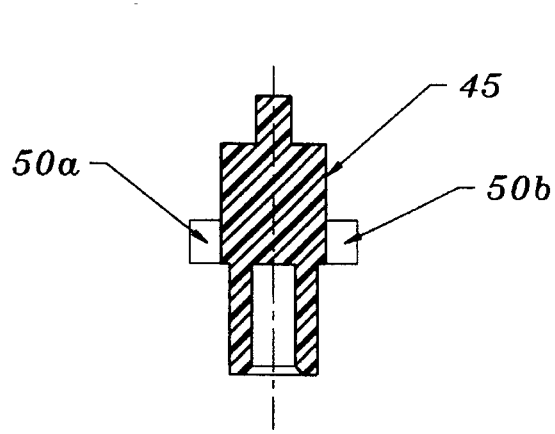
Fig. 17
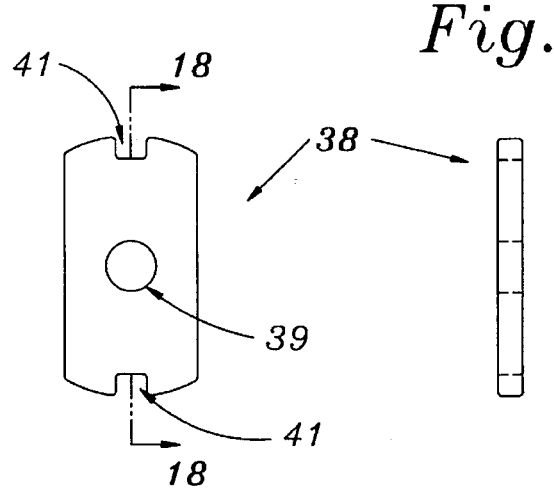
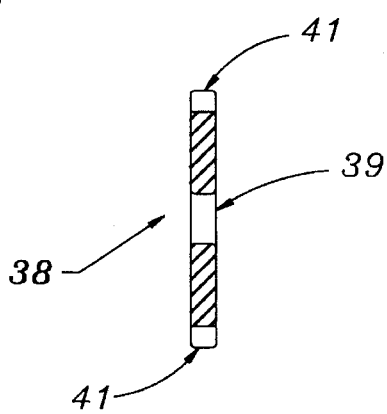
Fig. 16
Fig. 18

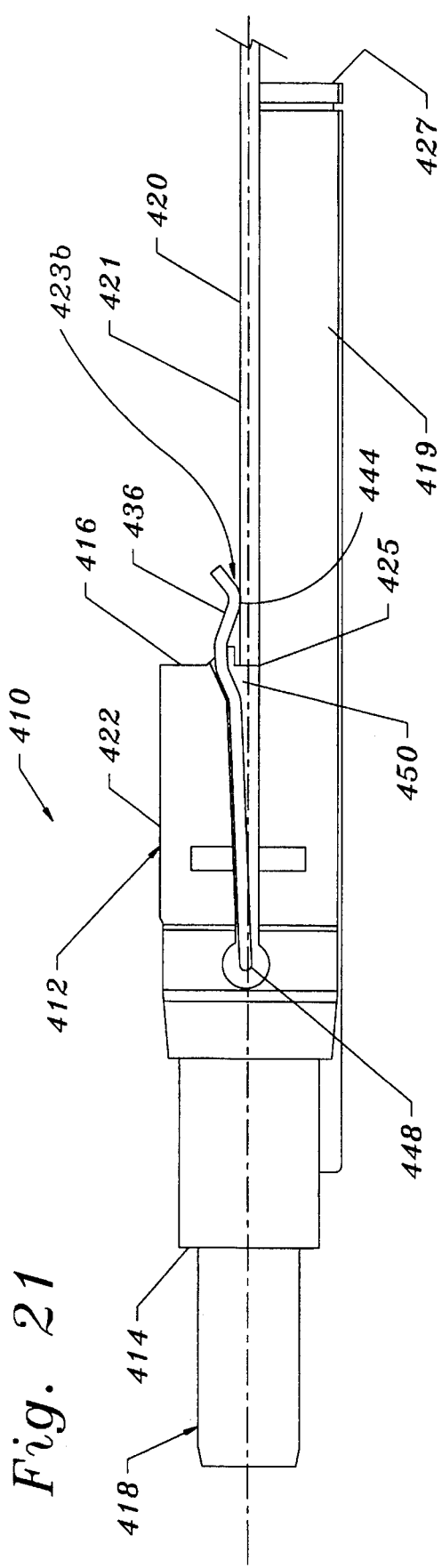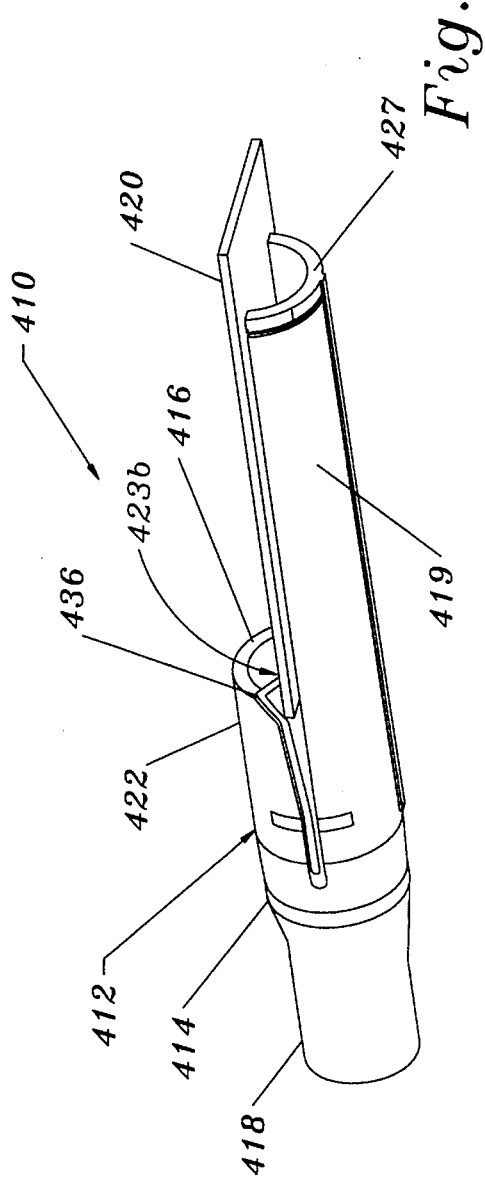

SWITCH FOR COMPUTER PEN

CROSS-REFERENCE TO RELATED APPLICATION

The present invention is a continuation-in-part application based on prior application Ser. No. 08/210,935 filed on Mar. 21, 1994, and entitled "Switch For Computer Pen."

BACKGROUND OF THE INVENTION

This invention relates generally to writing instruments and more particularly, it relates to a switch structure for use in computer pen-based applications which can be easily adapted to perform either as a "writing" pen, an "artist" pen, or a "CAD" pen.

As is generally well-known in the computer field, there are various types of input devices which have been developed heretofore for use by users to enter commands and data for processing by the computer. Alphanumeric keyboards are the most commonly used form of an input device for computers so as to enter commands and data in a textual format for processing. However, keyboards are not well-suited for entering graphics data. As a result, a variety of alternative input devices have been designed for those applications in which the keyboard is inappropriate.

One such alternative input device is a mouse pointing device which includes a ball-in-socket assembly wherein the direction and extent of movement of the ball is sensed by the computer for purposes of entering textual and graphics data. A second alternative input device is a digitizer tablet which has a flat pad that can be touched by a stylus so as to enter graphics data. A third alternate input device is a writing device such as a pen and the like. It appears that the writing device is the most superior of the various input devices since it is the easiest for man to use.

Typically, the computer pen used in association with a computer screen has generally three particular applications: (1) as a "writing" pen for allowing the user to enter written information into the computer, (2) as an "artist" pen so as to allow the drawer to vary the line thickness drawn through the usage of a pressure transducer, and (3) as a "CAD" pen for selecting of different commands on a digitizer tablet. Conventionally, the computer pens known in the art are designed and manufactured to only perform one of these three functions. Each device requires a different switch and associated components. Thus, different computer pens would be required to be made in order to perform all of the functions. As a result, the cost for such manufacturing and assembling of the different computer pens becomes quite considerable.

It would therefore be desirable to provide a switch structure of a simple and compact configuration for use in a computer pen which is formed of a minimal number of components that can be manufactured at relatively low cost and are easy to assemble. Further, it would be expedient that the components of the switch structure can be modified or adapted so as to be utilized for each of the three common pen applications, thereby facilitating the ease of manufacturing and assembly.

SUMMARY OF THE INVENTION

Accordingly, it is a general object of the present invention to provide a switch structure for use in computer pen-based applications which can be easily adapted to perform either as a "writing" pen, an "artist" pen, or a "CAD" pen.

It is an object of the present invention to provide a switch structure for use in computer pen-based applications which is formed of a minimal number of components that can be manufactured at relatively low cost and are easy to assemble.

It is another object of the present invention to provide a switch structure whose components can be easily modified so as to be utilized for each of the three common computer pen applications, thereby reducing manufacturing and assembly costs.

It is still another object of the present invention to provide a switch structure for use in computer pen-based applications which has a high degree of reliability in making and breaking of circuit connections with a relatively small amount of travel.

In one preferred embodiment of the present invention, there is provided a switch structure for use in a computer pen which includes a cylindrically-shaped housing having an inner wall surface and a hollow sleeve disposed coaxially within the inner wall surface in a spaced apart relationship to define first and second annular cavities therebetween. The housing has a first end closed by an annular flange and a second end. A top compression spring is disposed circumferentially on the outer surface of the hollow sleeve so to lie in the first annular cavity. An actuator is formed of a tubular member and is disposed in a cylindrically-shaped recess of the sleeve. The actuator includes a pair of opposed arcuate-shaped arms which are spaced radially from the outer surface of the tubular member. The arms are arranged to surround the outer circumferential surface of the hollow sleeve. A bottom compression spring is disposed circumferentially on the outer surface of the hollow sleeve so as to lie in the second annular cavity.

A cover plate is provided for closing the second end of the housing. A pair of terminals are disposed in the opposite sides of the housing in the area substantially intermediate the annular flange and the cover plate. A first end of the top spring supported by the annular flange and a second end thereof is supported by the arms of the actuator so that the second end thereof is disengaged from the pair of terminals when the actuator is in its fully extended position. A first end of the bottom spring is supported by the cover plate and a second end thereof is supported by the arms of the actuator so that the second end thereof contactly engages the pair of terminals to produce an electrical connection therebetween when the actuator is in the fully extended position.

The foregoing applies specifically to the disclosure of the parent Ser No. 08/210,935. A fifth embodiment of the present invention added by way of this continuation-in-part application is quite similar to the embodiments of FIGS. 1 through 11, except that the switch structures therein have been modified so as to include uniquely-designed PCB-connectible terminal pins which are adapted for electrical connections with a pair of electrodes formed on a printed circuit board. As a result, this added embodiment represents significant improvements over the embodiments of FIGS. 1 through 11 since it has eliminated the necessity for soldering hard-wire connections between the terminals in FIGS. 1–11 and the printed circuit board, thereby further reducing manufacturing and assembly costs.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein:

FIG. 1 is a perspective view of a first embodiment of a switch structure for use in a computer pen utilized as a "writing" pen, constructed in accordance with the principles of the present invention;

FIG. 2 is an exploded view of the switch structure of FIG. 1;

FIG. 3(a) is a longitudinal section view of the switch structure, taken along the lines 3a—3a of FIG. 1;

FIG. 3(b) is a longitudinal section view of the switch structure, taken along the lines 3b—3b of FIG. 1;

FIG. 8 is a view similar to FIG. 4 illustrating a third embodiment of a switch structure for use in a computer pen utilized as a "CAD" pen and the actuator being in the fully extended position;

FIG. 9 is a view similar to FIG. 8, illustrating the actuator in the fully retracted position;

FIG. 10 is a view similar to FIG. 4 illustrating a fourth embodiment of a switch structure for use in a computer pen utilized as a "CAD" pen and the actuator being in the fully extended position;

FIG. 11 is a view similar to FIG. 10, with the actuator illustrated in the fully retracted position;

FIG. 12 is a front end view of the actuator;

FIG. 13 is a rear end view of the actuator;

FIG. 14 is a cross-sectional view, taken along the lines 14—14 of FIG. 13;

FIG. 15 is a cross-sectional view, taken along the lines 15—15 of FIG. 13;

FIG. 16 is a front plan view of the cover plate;

FIG. 17 is a left or right side view of FIG. 16;

FIG. 18 is a cross-sectional view, taken along the lines 18—18 of FIG. 16;

FIG. 19 is a perspective view of a fifth embodiment of a switch structure 410 for use in a computer pen;

FIG. 21 is a side elevational view of the switch structure of FIG. 19;

DESCRIPTION OF THE PREFERRED EMBODIMENTS

Figure 4:
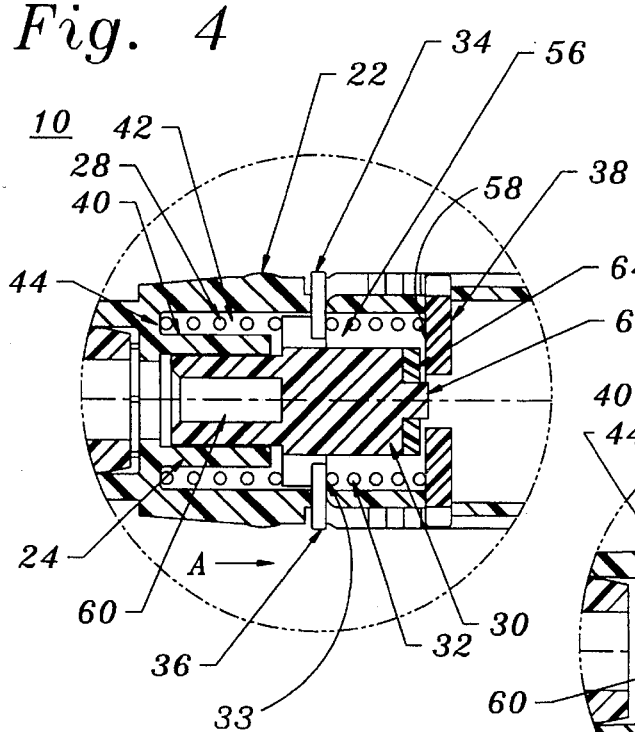
FIG. 4 is an enlarged view of the encircled area X of FIG. 3(b), with the actuator illustrated in the fully extended position.

Referring now in detail to the various views of the drawings, there is shown in FIGS. 1 through 5 a first embodiment of a switch structure 10 for use in a computer pen utilized as a "writing" pen, which is constructed in accordance with the principles of the present invention. The switch structure 10 is disposed in a cylindrically-shaped housing 12 having an upper end 14 and a lower end 16. The upper end 14 houses a ferrite core 18 which is operatively connected to a location detection means (not shown). The lower end 16 houses a printed circuit board 20 which has mounted thereon the location detection means. The cylindrically-shaped housing 12 further includes an intermediate portion 22 which has a hollow sleeve 24 disposed coaxially within the inner wall surface 26 of the housing.

The switch structure 10 is comprised of a top compression spring 28, an actuator 30, bottom compression spring 32, a pair of terminals 34 and 36, and a cover plate 38, such that all of the parts are arranged in the intermediate portion 22 of the housing 12. The top spring 28 is disposed circumferentially on the outer surface 40 of the sleeve 24 so as to lie in a first cavity 42 between the inner wall surface 26 of the housing 12 and the outer surface 40. One end of the top spring engages an annular flange 44 adjacent the upper end of the intermediate portion 22, and the other end thereof engages one side of the arms of the actuator 30. The pair of terminals 34 and 36 are press fitted into the opposed sides of the housing in the intermediate portion 22. As a result, the top spring 28 is trapped between the flange 44 and the arms of the actuator 30.

The actuator 30 is preferably formed of a suitable plastic material which can be fabricated by a conventional injection molding process. The details of the actuator are shown in FIGS. 12 through 15 of the drawings. The actuator includes a tubular member 45 and is disposed in the cylindrically-shaped recess 47 of the sleeve 24. The actuator 30 also includes a pair of opposed arcuate-shaped arms 46a and 46b which are spaced radially from the surface of the tubular member by integrally formed tabs 48. The arms 46a and 46b are also arranged so as to surround the outer circumferential surface of the sleeve 24. Gaps 50a and 50b are formed between the distal ends of the arms 46a and the distal ends of the arms 46b into which the respective terminals 34 and 36 project. A pair of diametrically opposed rib members 52a and 52b are formed on the surface of the tubular member 45 which are slidably received in co-mating axially extending slots 54a and 54b disposed in the sleeve.

The bottom compression spring 32 is also disposed circumferentially on the outer surface 40 of the sleeve 24 so as to lie in a second cavity 56 between the inner wall surface 26 of the housing and the outer surface 40. As the bottom spring 32 is compressed, the cover plate of a substantially rectangular construction is inserted into opposed slits 57 formed on the outer surface of the housing. Consequently, one end 33 of the bottom spring engages the other side of the arms, and the other end thereof engages the top surface 58 of the cover plate 38.

The details of the cover plate 38 are shown in FIGS. 16 through 18 of the drawings. The cover plate 38 includes a central aperture 39 and a pair of peripheral slots 41 formed on opposite sides of the central aperture 39.

As can best be seen from FIG. 4, with the actuator 30 in its initial inactivated position or fully extended position the bottom spring 32 is designed with a larger load due to its additional compression. While the top and bottom springs are identical in their construction and are preferably made from a phosphor bronze material, the bottom spring 32 has been compressed with a load force of approximately 60 grams and the top spring 28 has been compressed with a load force of approximately 30 grams. This is accomplished simply by making the axial dimension of the second cavity 56 to be smaller than the first cavity 42.

As a result, the actuator 30 will be located in its leftmost position, as shown in FIG. 4. In this situation, the left end of the bottom spring 32 will contactly engage both of the terminals 34 and 36 so as to provide a single-pole single-throw normally-closed (SPST-NC) circuit. The right end of the top spring 28 will not contact the terminals 34 and 36 due to the arms 46a and 46b of the actuator and serves to maintain a load on the actuator defining a zero tolerance condition. Therefore, this unique design construction allows the circuit to reliably break at relatively small displacements of the actuator with a relatively small amount of force. In practice, the actuation force that is required is about 30 grams and the amount of displacement is about 0.006 inches. Since the top and bottom springs conform to the locations of the terminals, the need for critical terminal alignment has been substantially reduced or eliminated.

It will be noted that the tubular member 45 of the actuator 30 has an upper end and a lower end. The upper end of the tubular member includes a small cylindrical recess 60 for receiving a pen tip or stylus (not shown). The lower end of the tubular member includes a central stem portion 62 for receiving a removable disc-like stop member 64. The stop member 64 is preferably formed of an elastomeric material such as rubber and the like.

Figure 5:
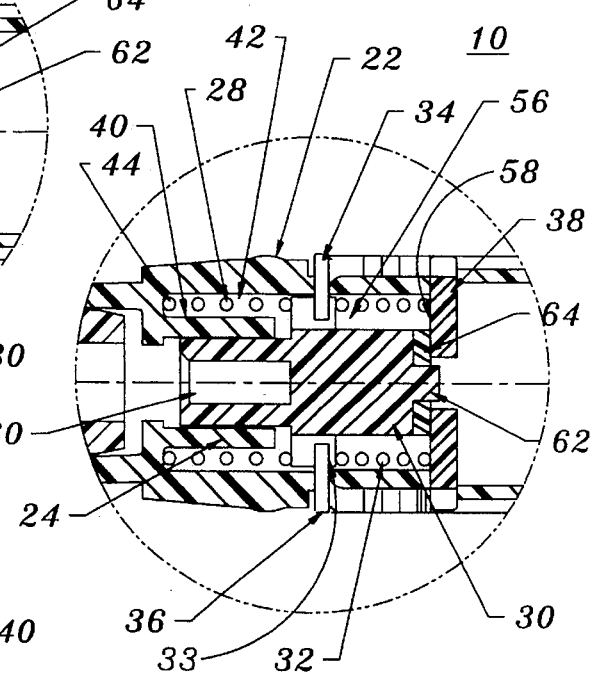
FIG. 5 is a view similar to FIG. 4, with the actuator illustrated in the fully retracted position.

In operation, when the user presses the pen tip or stylus (not shown) against a computer screen exceeding the 30 grams of actuator force the actuator 30 will slide axially to the right (in the direction of the arrow A in FIG. 4) to the activated position or fully retracted position, as illustrated in FIG. 5. In this condition, the actuator will be located in its rightmost position. The left end of the bottom spring 32 will now be disengaged from contacting the terminals 34 and 36 and thus breaking the electrical connection. It will be noted however, that the right end of the top spring 28 will still be disengaged from the terminals 34 and 36 due to the dimension of the arms 46a and 46b being greater than the small amount of movement of the actuator 30 itself. Further, it should be understood that the top surface 58 of the cover plate 38 serves as a stop limit member so as to limit the amount of movement of the actuator to the right. As can be seen, the bottom surface of the stop member 64 will be in contact engagement with the top surface 58 of the cover plate.

Figure 6:
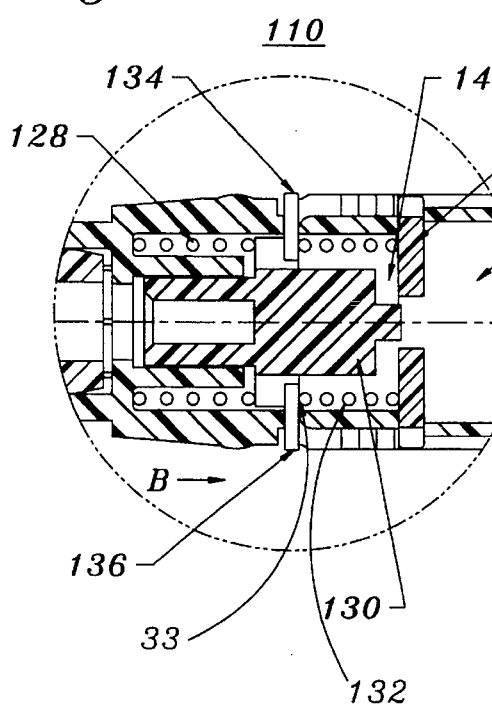
FIG. 6 is a view similar to FIG. 4, illustrating a second embodiment of a switch structure for use in a computer pen utilized as an "artist" pen with the actuator being in the fully extended position.
Figure 7:
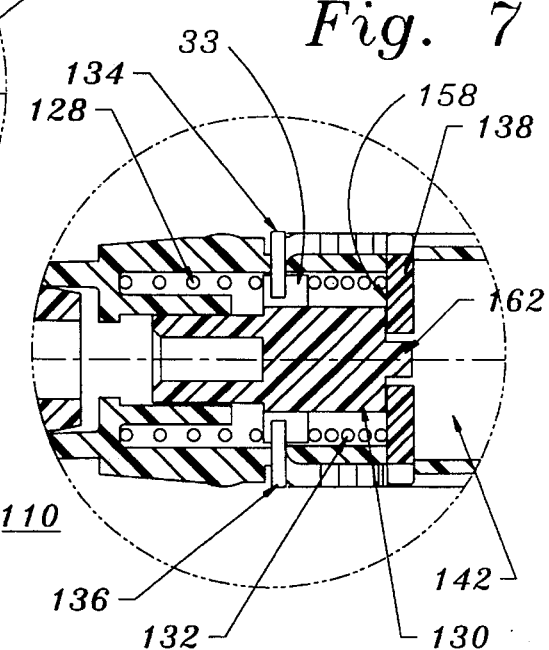
FIG. 7 is a view similar to FIG. 6, with the actuator illustrated in the fully retracted position.

In the second embodiment of the switch structure 110 in FIGS. 6 and 7 for use in a computer pen utilized as an "artist" pen, all of the parts are identical to the ones used in the switch structure 10 except that the stop member 64 has been removed. In particular, the switch structure 110 is comprised of a top compression spring 128, actuator 130, a bottom compression spring 132, a pair of terminals 134 and 136, and a cover plate 138. It is only the stop member 64 that has been removed from the switch structure 110 which makes it different from the switch structure 10. Referring specifically to FIG. 6, it can be seen that there is provided annular space 140 between the lower end of the actuator and the top surface of the cover plate which allows for additional travel of the actuator in order to activate a pressure transducer (not shown). The pressure transducer is mountable in an area 142 below the cover plate 138. The pressure transducer may be a conventional strain gauge which generates an electrical signal that is proportional to the amount of pressure applied so as to vary the thickness of the line drawn by the artist.

Again, in the fully extended position of FIG. 6, the right end of the top spring 128 will not engage the terminals 134 and 136, and the left end of the bottom spring 132 will be making contact with the terminals so as to produce the electrical connection therebetween. As the artist depresses the stylus against the computer screen, the actuator 130 will slide axially to the right (in the direction of the arrow B in FIG. 6) until the lower end thereof hits the top surface 158 of the cover plate 138, as shown in FIG. 7. In this manner, the stem 162 of the actuator will cause the pressure transducer to be activated due to this additional movement. In practice, the annular recess preferably has a dimension of approximately 0.025 inches. It should be noted that the dimension of the arms of the actuator must be wide enough so that this additional movement to the right will still not cause the right end of the top spring 128 to become engaged with the terminals 134 and 136. Alternatively, a ring insulator (not shown) may be inserted between the right end of the top spring 128 and the side of the arms in order to prevent engagement with the terminals due to the extra displacement. In comparison, the total travel in the switch structure 110 is approximately 0.031 inches as compared to the total travel of 0.006 inches in the switch structure 10.

In the third embodiment of the switch structure 210 of FIGS. 8 and 9 for use in a computer pen utilized as a "CAD" pen, all of the parts are identical to the ones used in the switch structure 110 with the added element of an O-ring insulator 240 and the provision of an annular recessed portion 242 in the cover plate 238. In particular, the switch structure 210 is comprised of a top compression spring 228, an actuator 230, a bottom compression spring 232, a pair of terminals 234 and 236, and a cover plate 238. It is only the insulator 240 and the annular recessed portion 242 which are different in the switch structure 210. Referring to FIG. 8, it can be seen that the insulator 240 is inserted between the side of the arms of the actuator 230 and the left end of the bottom spring 232 and that the annular recess portion 242 is formed in the top surface 258 of the cover plate 238.

Thus, in the fully extended position of FIG. 8, the left end of the bottom spring 232 is disengaged from the terminals 234 and 236 due to the insulator 240 and the right end of the top spring 228 is also disengaged from contacting the terminals. Accordingly, the switch structure 110 in FIGS. 6 and 7 has been converted to provide a single-pole single-throw normally-open (SPST-NO) circuit. As the user of the CAD pen depresses the stylus against the computer screen, the actuator 230 will slide axially to the right (in the direction of the arrow C in FIG. 8) until the lower end thereof comes to rest in the recessed portion 240, as depicted in FIG. 9. The right end of the top spring 228 will contactly engage with the terminals 234 and 236 in order to make the electrical connection therebetween. In practice, the thickness of the insulator is approximately 0.005 inches and the recessed portion 242 preferably has a depth of approximately 0.005 inches. Thus, the total travel in the switch structure 210 is approximately 0.025 inches. Optionally, in order to create a tactile feel when the stylus is pressed against the computer screen, a snap dome device 244 is added adjacent to the lower end of the cover plate 238 which is mechanically operated by the stem 262 of the actuator as it is displaced to the retracted position.

In the fourth embodiment of the switch structure 310 of FIGS. 10 and 11 for use in a computer pen utilized as a "CAD" pen, all of the parts are identical to the ones used in the switch structure 210 with the insulator being replaced by a spacer element 340. In particular, the switch structure 310 is comprised of a top compression spring 328, an actuator 330, a bottom compression spring 332, a pair of terminals 334 and 336, and a cover plate 338. It is only the added element of the spacer 340 which is different in the switch structure 310. Referring to FIG. 10, it can be seen that the spacer 340 is inserted between the annular flange and the left end of the bottom spring 332. It will be observed that the spacer effectively balances the top and bottom springs as separated by the actuator to be equidistant on each side of the terminals 334 and 336. Thus, the spacer 340 will break the electrical connection between the left end of the bottom spring 332 and the terminals 334 and 336 but yet still maintain the zero tolerance condition due to the top spring 328.

Therefore, in the fully extended position of FIG. 10, the left end of the bottom spring 332 is disengaged from the terminals due to the spacer 340 and the right end of the top spring is also disengaged from contacting the terminals. Accordingly, the switch structure 310 of FIGS. 10 and 11 also operates as a SPST-NO circuit. Again, as the user of the CAD pen depresses the stylus against the computer screen, the actuator 330 will slide axially to the right (in the direction of the arrow D in FIG. 10) to the fully retracted position, as illustrated in FIG. 11. The right end of the top spring 328 will again contactly engage with the terminals 324 and 326 in order to make the electrical connection therebetween.

From the foregoing detailed description, it can thus be seen that the present invention provides a unique switch structure for use in computer pen-based applications which can be easily adapted to perform either as a "writing" pen, an "artist" pen, or a "CAD" pen. The switch structure is essentially comprised of a top compression spring, an actuator, a bottom compression spring, a pair of terminals, and a cover plate which can be modified so as to be utilized in each of the three common pen applications, thereby reducing the cost of manufacture and assembly.

In a fifth embodiment of the present invention, the pair of terminals in the earlier embodiments are replaced with a pair of PCB-connectible terminal pins which are suitably designed so as to make or engage in electrical connections with an associated pair of electrodes formed on a printed circuit board. A semi-cylindrical extension is formed integrally with the bottom half of the lower end at the intermediate portion of the housing. The extension serves to support the bottom surface of the printed circuit board. The printed circuit board has formed thereon the pair of electrodes which are arranged opposite each other at its one end.

Figure 20:
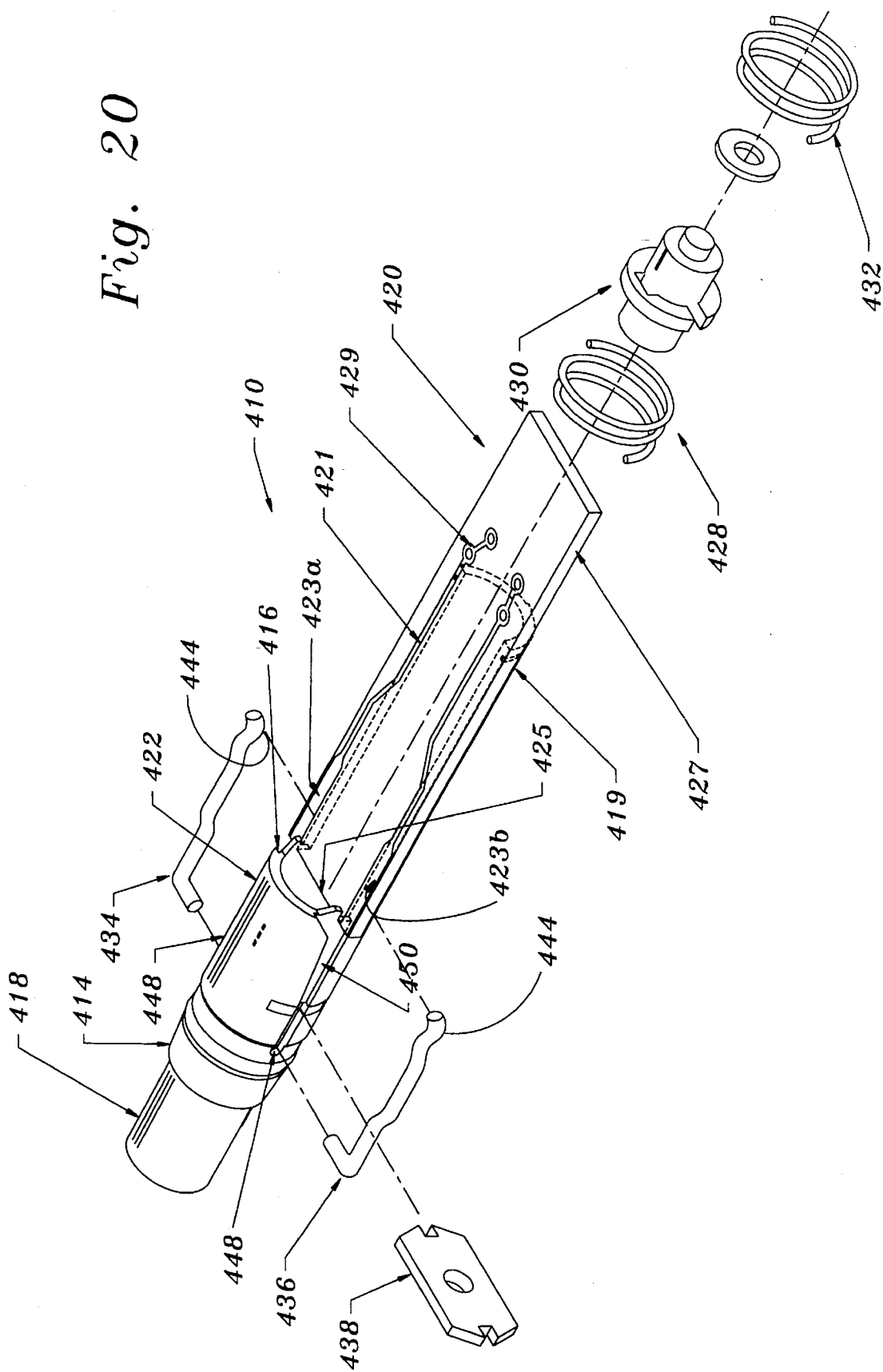
FIG. 20 is an exploded view of the switch structure of FIG. 19.
Figure 22:
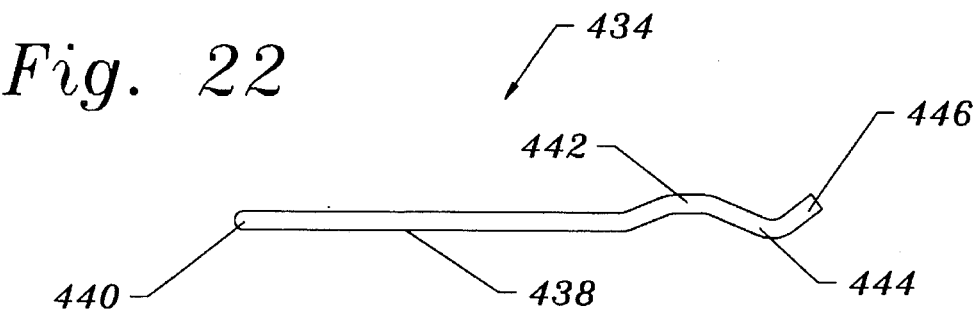
FIG. 22 is a top plan view of the terminal pin 434 of FIG. 20.

In FIGS. 19–21, there is illustrated a fifth embodiment of a switch structure 410 of the present invention for use in a computer pen. All of the parts in the fifth embodiment are identical to the ones used in the switch structures 10, 110, 210, or 310, except for the corresponding pair of terminals 34, 36; 134, 136; 234, 236; or 334, 336. In particular, the switch structure 410 is likewise comprised of a top compression spring 428, an actuator 430, a bottom compression spring 432, and a cover plate 438. It is only the corresponding pair of terminals 34, 36; 134, 136; 234, 236; or 334, 336 that have been replaced by a pair of PCB-connectible terminal pins 434, 436 in the switch structure 410 which makes it different from the switch structures 10, 110, 210 or 310.

Referring specifically to FIG. 20, it can be seen that the switch structure 410 is disposed in a cylindrically-shaped housing 412 having an upper end 414 and a lower end 416. The upper end 414 houses a ferrite core 418 which is operatively connected to a location detection means (not shown). The cylindrically-shaped housing 412 further includes an intermediate portion 422 disposed between the upper end 414 and the lower end 416. The intermediate portion 422 contains the top compression spring 428, the actuator 430, the bottom compression spring 432, and the cover plate 438.

The housing 412 also includes a hollow, semi-cylindrical extension 419 formed integrally with and extending longitudinally from the bottom half of the lower end 416 at the intermediate portion 422 thereof. The edge portions 421 of the hollow extension 419 serves to support the bottom surface of a printed circuit board 420 which has mounted thereon the location detection means. The printed circuit board 420 has formed on its top surface a pair of electrodes 423a and 423b which are arranged opposite each other at its one end 425. Adjacent the other end 427 of the printed circuit board, there are provided a plurality of mounting holes 429 which are used to facilitate connections to other electrical components and the like.

Figure 23:
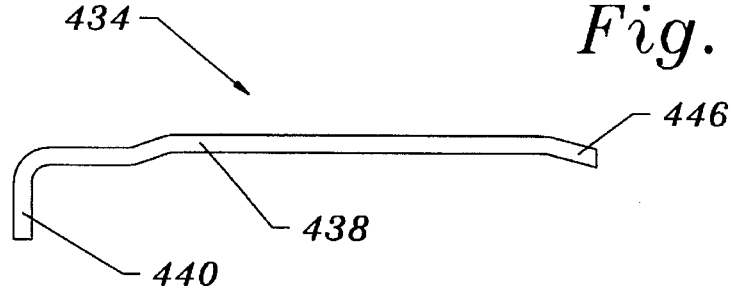
FIG. 23 is a side elevational view of the terminal pin 434 of FIG. 20.
Figure 24:
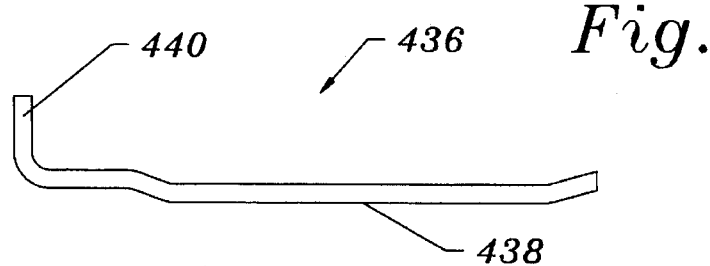
FIG. 24 is a top plan view of the terminal pin 436 of FIG. 20.
Figure 25:
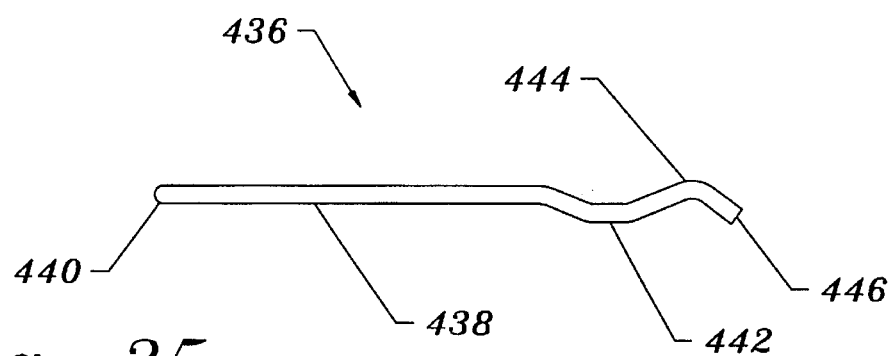
FIG. 25 is a side elevational view of the terminal pin 436 of FIG. 20.

It will be noted that the pair of PCB-connectible terminal pins 434 and 436 are press fitted into the opposite sides of the housing 412 in the intermediate portion 422 thereof. The terminal pins 434 and 436 are preferably formed of an electrical conductive material such as stainless steel and are substantially identical in their construction. The details of the terminal pin 434 are shown in FIGS. 23 and 24, and the details of the terminal pin 436 are shown in FIGS. 24 and 25.

Each of the terminal pins 434 and 436 includes a substantially horizontal body portion 438 which has connected integrally and perpendicularly at its left end a short and inwardly extending leg portion 440. At the opposite or right end of the horizontal body portion 438, there is provided a bight section 442. A reversely bent portion 444 is connected integrally to the right end of the bight section 442. The reversely bent portion 444 terminates in an upwardly directed tip portion 446.

As can be best seen from FIG. 21, the leg portion 440 of the terminal pins are insertable in opposed openings 448 formed in the intermediate portion 422 of the housing. Further, the horizontal body portion 438 and the bight section 442 of the terminal pins are adapted to fit in contoured grooves 450 formed in the outer side wall of the intermediate portion 422. The end 425 of the printed circuit board 420 is slid underneath the reversely bent portions 444 of the terminal pins 434 and 436 so as to cause their engagement with the associated pair of electrodes 423a and 423b, thereby making electrical connections inbetween. Therefore, these uniquely-designed PCB-connectible terminal pins 434 and 436 allow for electrical connections to be made with the printed circuit board without the need of soldering of hard-wire connections between the terminal pins and the printed circuit board. As a result, there has been substantially reduced the amount of labor costs required in the manufacturing and assembling of the switch structure 410.

While there has been illustrated and described what are at present considered to be preferred embodiments of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiments disclosed as the best modes contemplated for carrying out the invention, but that the invention will include all embodiments falling within the scope of the appended claims.

What is claimed is:

1. A switch structure for use in a computer pen comprising:

a cylindrically-shaped housing having an inner wall surface and a hollow sleeve disposed coaxially within said inner wall surface in a spaced apart relationship to define first and second annular cavities therebetween, said housing having a first end disposed adjacent to an annular flange, a second end, and an intermediate portion disposed between said first end and said second end;

said housing further including a hollow, semi-cylindrical extension formed integrally with said lower end at said intermediate portion and extending longitudinally therefrom;

a top compression spring disposed circumferentially on the outer surface of said hollow sleeve so as to lie in said first annular cavity;

an actuator disposed in said housing for movement between a fully extended position and a fully retracted position and being formed of a tubular member and disposed in a cylindrically-shaped recess of said sleeve, said actuator including a pair of opposed arcuate-shaped arms which are spaced radially from the outer surface of said tubular member, said arms surrounding the outer circumferential surface of said hollow sleeve;

a bottom compression spring being disposed circumferentially on the outer surface of said hollow sleeve so as to lie in said second annular cavity;

a cover plate for closing the second end of said housing;

a printed circuit board being supported by said hollow extension, said printed circuit board having a pair of fixed spaced-apart electrodes formed on its one end;

a pair of PCB-connectible terminal pins disposed in said intermediate portion of said housing for engagement with a respective one of said pair of electrodes on said printed circuit board to produce electrical connections therebetween;

a first end of said top spring being supported in said annular flange and a second end thereof being supported by the arms of said actuator so that the second end thereof is disengaged from said pair of terminal pins when said actuator is moved to its fully extended position; and a first end of said bottom spring being supported by said cover plate and a second end thereof being supported by the arms of said actuator so that the second end thereof contactly engages said pair of terminal pins to produce an electrical connection between said pair of electrodes when said actuator is moved to its fully extended position.

2. A switch structure as claimed in claim 1, wherein each of said terminal pins includes a short leg portion, a horizontal body portion, a bight section, a reversely bent portion, and an upwardly directed tip portion.

3. A switch structure as claimed in claim 2, wherein said leg portions of said terminal pins are insertable in opposed openings formed in said intermediate portion of said housing.

4. A switch structure as claimed in claim 3, wherein said housing body portion and said bight section of said terminal pins are press fitted in contoured grooves formed in the outer side wall of said intermediate portion.

5. A switch structure as claimed in claim 4, wherein one end of said printed circuit board is slid underneath said reversely bent portions of said terminal pins so as to contactly engage said pair of electrodes on said printed circuit board in order to produce the electrical connections.

6. A switch structure as claimed in claim 1, wherein said pair of PCB-connectible terminal pins are formed of an electrically conductive material.

7. A switch structure as claimed in claim 1, wherein said pair of PCB-connectible terminal pins are formed of a stainless steel material.

8. A switch structure as claimed in claim 1, wherein said hollow extension includes edge portions which support the bottom surface of said printed circuit board.

9. A switch structure for use in a computer pen comprising:

cylindrically-shaped housing means having an inner wall surface and a hollow sleeve disposed coaxially within said inner wall surface in a spaced apart relationship to define first and second annular cavities therebetween, said housing means having a first end closed by an annular flange, a second end, and an intermediate portion disposed between said first end and said second end;

said housing means further including a hollow, semi-cylindrical extension formed integrally with said lower end at said intermediate portion and extending longitudinally therefrom;

top compression means disposed circumferentially on the outer surface of said hollow sleeve so as to lie in said first annular cavity;

actuator means disposed in said housing means for moving between a fully extended position and a fully retracted position and being formed of a tubular member and disposed in a cylindrically-shaped recess of said sleeve, said actuator including a pair of opposed arcuate-shaped arms which are spaced radially from the outer surface of said tubular member, said arms surrounding the outer circumferential surface of said hollow sleeve;

bottom compression means being disposed circumferentially on the outer surface of said hollow sleeve so as to lie in said second annular cavity;

cover means for closing the second end of said housing means;

a printed circuit board being supported by said hollow extension, said printed circuit board having a pair of fixed spaced-apart electrodes formed on its one end;

a pair of PCB-connectible terminal pins disposed in said intermediate portion of said housing means for engagement with a respective one of said pair of electrodes on said printed circuit board to produce electrical connections therebetween; and said bottom compression means contactly engaging said terminal pins to produce an electrical connection between said pair of electrodes when said actuator means is moved to its fully extended position.

10. A switch structure as claimed in claim 9, wherein each of said terminal pins includes a short leg portion, a horizontal body portion, a bight section, a reversely bent portion, and an upwardly directed tip portion.

11. A switch structure as claimed in claim 10, wherein said leg portions of said terminal pins are insertable in opposed openings formed in said intermediate portion of said housing means.

12. A switch structure as claimed in claim 11, wherein said housing body portion and said bight section of said terminal pins are press fitted in contoured grooves formed in the outer side wall of said intermediate portion.

13. A switch structure as claimed in claim 12, wherein said one end of said printed circuit board is slid underneath said reversely bent portions of said terminal pins so as to contactly engage said pair of electrodes on said printed circuit board in order to produce the electrical connections.

14. A switch structure as claimed in claim 9, wherein said pair of PCB-connectible terminal pins are formed of an electrically conductive material.

15. A switch structure as claimed in claim 9, wherein said pair of PCB-connectible terminal pins are formed of a stainless steel material.

16. A switch structure as claimed in claim 9, wherein said hollow extension includes edge portions which support the bottom surface of said printed circuit board.

17. A switch structure for use in a computer pen comprising:

housing means having a closed end, a second end, and an intermediate portion disposed between said first end and said second end;

said housing means further including a hollow, semi-cylindrical extension formed integrally with said lower end at said intermediate portion and extending longitudinally therefrom;

non-conducting actuating means disposed in said housing for moving between a first position and a second position;

first electrically-conductive compression means disposed on first side of said actuating means for generating a zero tolerance condition;

second electrically-conductive compression means disposed on second side of said actuating means and having a larger load than said first compression means so as to maintain said actuating means in said first position;

cover means for closing said open end;

a printed circuit board being supported by said hollow extension, said printed circuit board having a pair of fixed spaced-apart electrodes formed on its one end;

a pair of PCB-connectible terminal pins disposed in said intermediate portion of said housing means for engagement with a respective one said pair of electrodes on said printed circuit board to produce electrical connections therebetween; and said second electrically-conductive compression means contactly engaging said terminal pins to produce an electrical connection between said pair of electrodes when said actuator is moved to its first position.

18. A switch structure as claimed in claim 17, wherein each of said terminal pins includes a short leg portion, a horizontal body portion, a bight section, a reversely bent portion, and an upwardly directed tip portion.

* * * * *